United States Patent
Kim et al.

(10) Patent No.: US 7,989,801 B2
(45) Date of Patent: Aug. 2, 2011

(54) ORGANIC LIGHT EMITTING DISPLAY DEVICE AND METHOD OF DRIVING THE SAME

(75) Inventors: Mu-Gyeom Kim, Yongin-si (KR);
Jang-Seok Ma, Yongin-si (KR);
Sung-Hun Lee, Yongin-si (KR);
Jung-Bae Song, Yongin-si (KR);
Sang-Yeol Kim, Yongin-si (KR);
Dong-Ho Kim, Seoul (KR)

(73) Assignee: Samsung Electronics Co., Ltd., Maetan-dong Yeongtong-gu, Suwon-si, Gyeonggi-do (KR)

( * ) Notice: Subject to any disclaimer, the term of this patent is extended or adjusted under 35 U.S.C. 154(b) by 586 days.

(21) Appl. No.: 12/216,898

(22) Filed: Jul. 11, 2008

(65) Prior Publication Data
US 2009/0230871 A1    Sep. 17, 2009

(30) Foreign Application Priority Data
Mar. 11, 2008  (KR) .................. 10-2008-0022607

(51) Int. Cl.
*H01L 51/00*  (2006.01)

(52) U.S. Cl. ........... 257/40; 257/E51.013; 257/E51.017; 257/E51.018; 257/E51.046

(58) Field of Classification Search ............... 315/169.3, 315/169.1, 246; 313/483, 498, 506, 507; 257/40, E51.013, E51.017, E51.018, E51.046; 438/99; 428/917, 690
See application file for complete search history.

(56) References Cited

U.S. PATENT DOCUMENTS

| | | | | |
|---|---|---|---|---|
| 7,420,203 | B2 * | 9/2008 | Tsutsui et al. | 257/40 |
| 7,537,947 | B2 * | 5/2009 | Smith et al. | 438/29 |
| 7,601,988 | B2 * | 10/2009 | Seo et al. | 257/40 |
| 7,893,427 | B2 * | 2/2011 | Kumaki et al. | 257/40 |
| 2006/0214553 | A1 * | 9/2006 | Nagara et al. | 313/483 |

* cited by examiner

*Primary Examiner* — Jacob Y Choi
*Assistant Examiner* — Ephrem Alemu
(74) *Attorney, Agent, or Firm* — Robert E. Bushnell, Esq.

(57) ABSTRACT

Provided are an organic light emitting display device coupled to a photoelectric transistor. The organic light emitting display device includes an anode and a cathode separated from each other, a plurality of organic material layers formed between the anode and the cathode and including an organic light emitting layer, a light source applying an excitation pulse to the organic material layers, and a light receiving unit measuring changes in photoluminescence (PL) signals that are emitted from the organic material layers.

19 Claims, 5 Drawing Sheets

ORGANIC LIGHT EMITTING DISPLAY DEVICE AND METHOD OF DRIVING THE SAME

CLAIM OF PRIORITY

This application makes reference to, incorporates the same herein, and claims all benefits accruing under 35 U.S.C. §119 from an application for ORGANIC LIGHT EMITTING DISPLAY DEVICE AND METHOD OF DRIVING THE SAME earlier filed in the Korean Intellectual Property Office on the 11th of Mar. 2008 and there duly assigned Serial No. 10-2008-0022607.

BACKGROUND OF THE INVENTION

1. Field of the Invention

The present invention relates to a display device, and more particularly, to an organic light emitting display device embedded with a photoelectric transistor, and a method of driving the same.

2. Description of the Related Art

An organic light emitting display device emits light by combining holes supplied from an anode and electrons supplied from a cathode in an organic light emitting layer. Organic light emitting display devices can be classified into passive matrix (PM) type organic light emitting display devices and active matrix (AM) type organic light emitting display devices. However, most of the development has been recently focused on AM type organic light emitting display devices, in which pixels are independently driven. AM type organic light emitting display devices can realize large-sized displays since pixels emit light according to voltage pulses controlled by a thin film transistor (TFT).

Organic light emitting display devices are widely used in display applications such as televisions (TVs), monitors for personal computers (PC), mobile communication terminals, moving picture experts group (MPEG) layer 3 (MP3) players, and navigators owing to their good color reproduction, fast response time, self-emission, small thickness, high contrast, wide viewing angle, and low power consumption. In addition, since organic light emitting display devices have fast response time, in the order of several micro-seconds, which is much faster than that of liquid crystal display (LCD) devices that is in the order of several milliseconds, organic light emitting display devices are advantageous for displaying moving pictures.

As described above, in an organic light emitting display device, excitons are formed by combinations of electrons and holes in the light emitting layer, thereby emitting light, several micro-seconds after an electric signal is applied. In general, an organic light emitting display device includes a plurality of organic material layers such as a charge injection layer injecting the holes or the electrons, a charge transport layer for transporting the injected charges, and a light emitting layer emitting light by combining holes and electrons. Therefore, in an organic light emitting display device having the above structure, it takes several micro-seconds for the holes and electrons to reach the light emitting layer through the charge injection layer and the charge transport layer after the electric signal is applied to the device.

SUMMARY OF THE INVENTION

The present invention provides an organic light emitting display device that may use organic material layers in light emission pixels as processing circuits, and a method of driving the organic light emitting display device.

According to an aspect of the present invention, there is provided an organic light emitting display device including: an anode and a cathode separated from each other; a plurality of organic material layers formed between the anode and the cathode and one of the organic material layers comprising an organic light emitting layer; a light source applying an excitation pulse to the organic material layers; and a light receiving unit measuring changes in photoluminescence (PL) signals that are emitted from the organic material layers.

The excitation pulse emitted from the light source may be applied to the organic material layers after a voltage pulse is applied between the anode and the cathode and before an electroluminescence (EL) operation starts. The voltage pulse, the excitation pulse, and the changes of the PL signals may respectively correspond to a gate pulse applied to a gate, a source pulse applied a source, and a signal output from a drain of a photoelectric transistor.

The organic light emitting layer may be disposed between a first one of the organic material layers and a second one of the organic material layers. The first one of the organic material layers may include a hole injection layer and a hole transport layer that are sequentially stacked between the anode and the organic light emitting layer. The second one of the organic material layers may include an electron injection layer and an electron transport layer that are sequentially stacked between the cathode and the organic light emitting layer. The organic light emitting layer may include at least one of a red light emitting layer, a green light emitting layer, and a blue light emitting layer.

The excitation pulse may have a band gap energy that is greater than that of the organic light emitting layer. The light receiving unit may measure a change in intensity or a decay time of the PL signal emitted from each of the organic material layers.

The organic light emitting display device may further include a first waveguide disposed between the light source and the organic material layers for guiding the excitation pulse emitted from the light source toward the organic material layers. The organic light emitting display device may further include a second waveguide disposed between the organic material layers and the light receiving unit for guiding the PL signals emitted from the organic material layers toward the light receiving unit.

The organic light emitting display device may further include a PL blocking layer formed on the cathode for preventing the PL signals emitted from the organic material layers from leaking.

The excitation pulse emitted from the light source may be incident to an end portion of a lower surface of the organic material layers that is closest to the light source, and the PL signals may be emitted from the other end portion on the lower surface.

According to another aspect of the present invention, there is provided a method of driving an organic light emitting display device, which comprises an anode and a cathode separated from each other, and a plurality of organic material layers formed between the anode and the cathode, the method including: applying a voltage pulse between the anode and the cathode, applying a predetermined excitation pulse to the organic material layers from a light source after the application the voltage pulse and before an EL operation starts, and measuring changes in the photoluminescence (PL) signals emitted from the organic material layers.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the present invention will be described in detail by explaining exemplary embodiments of the invention with reference to the attached drawings. Like reference numerals in the drawings denote like elements. In the drawings, the thicknesses of layers and regions are exaggerated for clarity.

Figure 1:
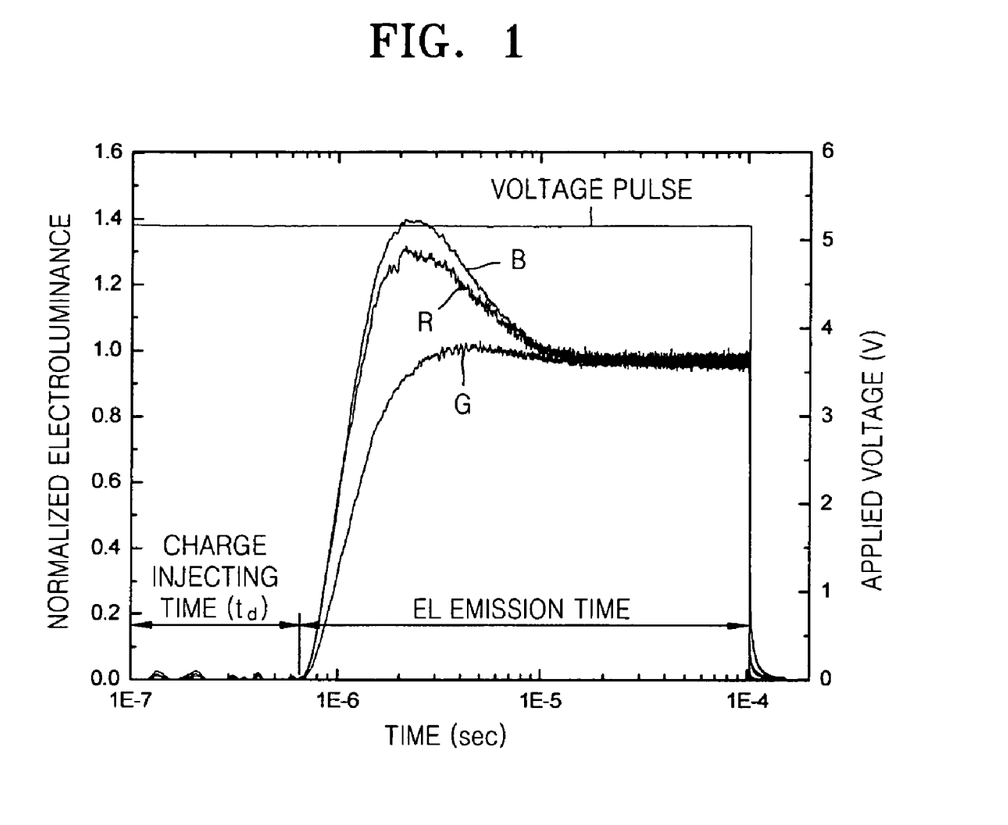
FIG. 1 is a graph showing electroluminescence (EL) of each of a plurality of light emitting layers of an organic light emitting device according to time in a case where a voltage pulse is applied to the organic light emitting device.

FIG. 1 is a graph showing electroluminescence (EL) of each of a plurality of light emitting layers of an organic light emitting device with respect to time in a case that a voltage pulse is applied to the organic light emitting device.

Referring to FIG. 1, holes and electrons are combined and an electroluminescence (EL) operation starts about $7 \times 10^{-7}$ seconds after the voltage pulse is applied. Here, a time taken from the application of the voltage pulse to the start of the EL operation is referred to as a light emission delay time $t_d$ or a light emission start time. The light emission delay time $t_d$ means a time taken for the holes and electrons to be transported to the light emission layers through a charge injection layer and a charge transport layer, that is, a charge injecting time. In addition, as shown in FIG. 1, after the charge injecting time $t_d$ has elapsed, red (R), green (G), and blue (B) light is emitted in the order, because the injections of holes and electrons are performed in a timing order.

In general, when an organic material layer is irradiated with light of a predetermined wavelength, for example, ultraviolet (UV) light, the organic material layer emits light of a wavelength that is lower than that of the UV light, that is, a photoluminescence (PL) signal, due to a PL operation. On the other hand, when the organic material layer is irradiated with the UV light while voltage is applied to the organic material layer, an intensity of the PL signal emitted from the organic material layer becomes different from the PL signal emitted while voltage is not applied to the organic material layer. In addition, when the voltage is applied to the organic material layer in a pulse form, a decay time of the PL signal emitted from the organic material layer is different from the PL signal emitted while voltage is not applied to the organic material layer. As described above, when the voltage is applied to the organic material layer, a concentration of charges in the organic material layer is changed, and the change in the concentration of charges causes the change in the signal intensity or the change in the decay time of the PL signal.

Figure 2:
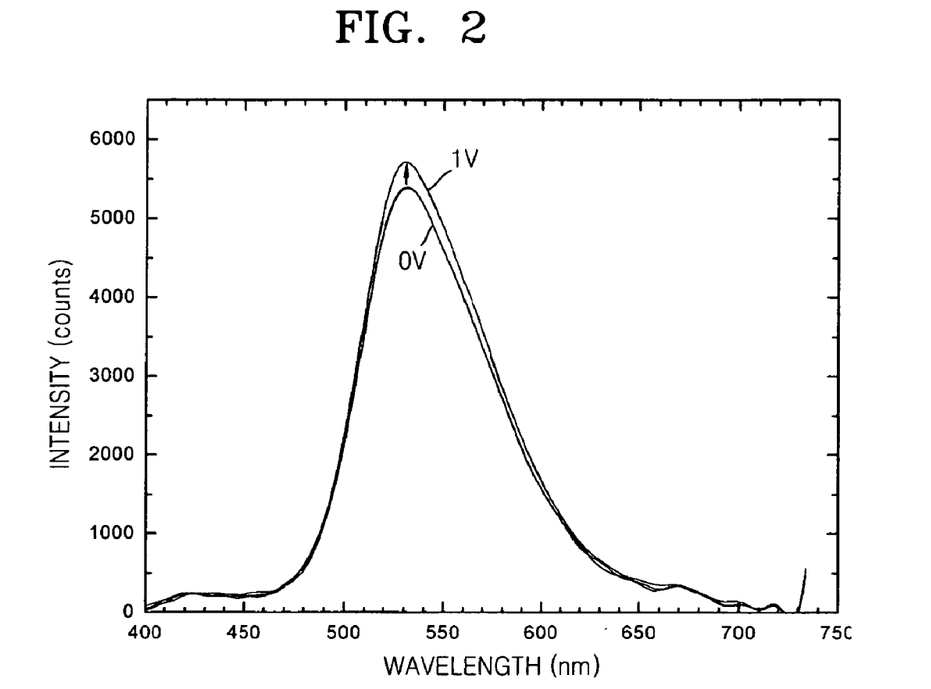
FIG. 2 is a graph showing changes in an intensity of photoluminescence (PL) according to wavelength of an organic material layer according to changes in a voltage pulse.

FIG. 2 is a graph showing changes in the intensity of the PL signal that is emitted from the organic material layer when the voltage is applied to the organic material layer. In this regard, the organic material layer includes a tris-(8-hydroxyquinoline)aluminum (Alq) layer having a thickness of 40 nm and a green light emitting layer having a thickness of 20 nm. Referring to FIG. 2, when a voltage of 1 V is applied to the organic material layer, the intensity of the PL signal emitted from the organic material layer is greater than the PL signal emitted when the voltage is not applied to the organic material layer.

Meanwhile, in an organic light emitting device including a plurality of organic material layers, the time taken for charges to stay in each of the organic material layers is different by layers within the charge injecting time $t_d$, that is, the time taken before the EL operation starts. Accordingly, the concentration of charges in each of the organic material layers is changed according to the time elapsed, and the change in the charge concentration causes the change in the intensity or in the decay time of the PL signals emitted from the organic material layers.

According to the present invention, the organic light emitting device is used as a photoelectric transistor by detecting the change in the intensity or in the decay time of the PL signal that is emitted from the organic material layers within the charge injecting time $t_d$. Here, the voltage pulse applied to the organic material layers may correspond to a pulse applied to a gate of the photoelectric transistor, and an excitation pulse applied to the organic material layers may correspond to a pulse applied to a source of the photoelectric transistor. In addition, the change in the intensity or the decay time of the PL signal emitted from the organic material layer may correspond to an output of a drain of the photoelectric transistor.

Figure 3:
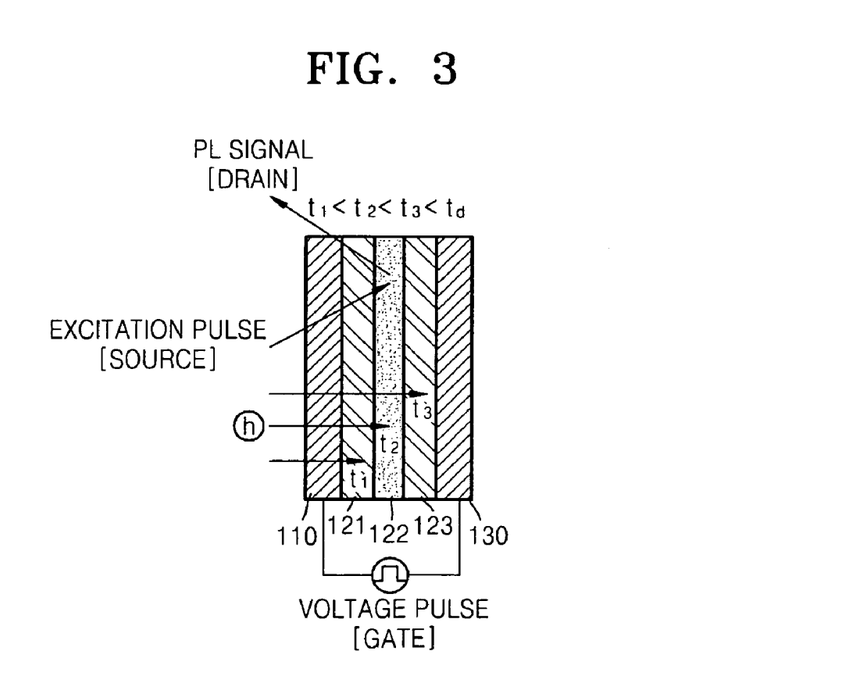
FIG. 3 is a diagram illustrating an organic light emitting device used as a photoelectric transistor within a light emission delay time $t_d$, according to an embodiment of the present invention.

FIG. 3 is a diagram showing an organic light emitting device that is used as a photoelectric transistor during a charge injecting time $t_d$, according to an embodiment of the present invention.

Referring to FIG. 3, the organic light emitting device according to the current embodiment of the present invention includes a first organic material layer 121, a second organic material layer 122, and a third organic material layer 123 sequentially stacked between an anode 110 and a cathode 130. In FIG. 3, reference numerals $t_1$, $t_2$, and $t_3$ denote times for holes h to reach the first, second, and third organic material layers 121, 122, and 123, respectively. In the above structure, excitation pulses such as UV pulses are applied to the first, second, and third organic material layers 121, 122, and 123 from an external device during the charge injecting time $t_d$, and changes in PL signals emitted from the first, second, and third organic material layers 121, 122, and 123 are measured. Here, the voltage pulse applied to the organic light emitting device, the excitation pulses applied to the first, second, and third organic material layers 121, 122, and 123, and the change in the PL signals emitted from the first, second, and third organic material layers 121, 122, and 123 may correspond to a pulse applied to a gate, a pulse applied to a source, and a signal output from a drain in the photoelectric transistor, respectively.

Figure 4A:
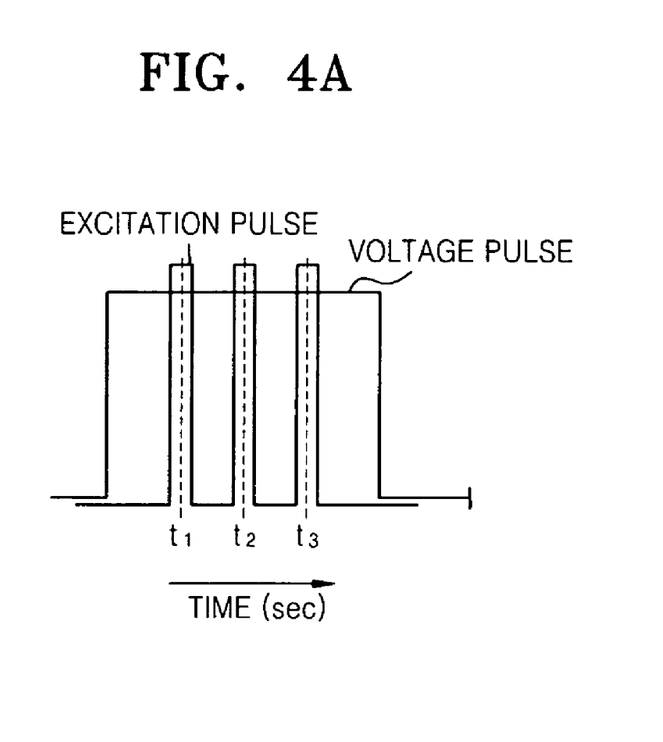
FIG. 4A shows a voltage pulse and an excitation pulse applied to the organic light emitting device illustrated in FIG. 3.
Figure 4B:
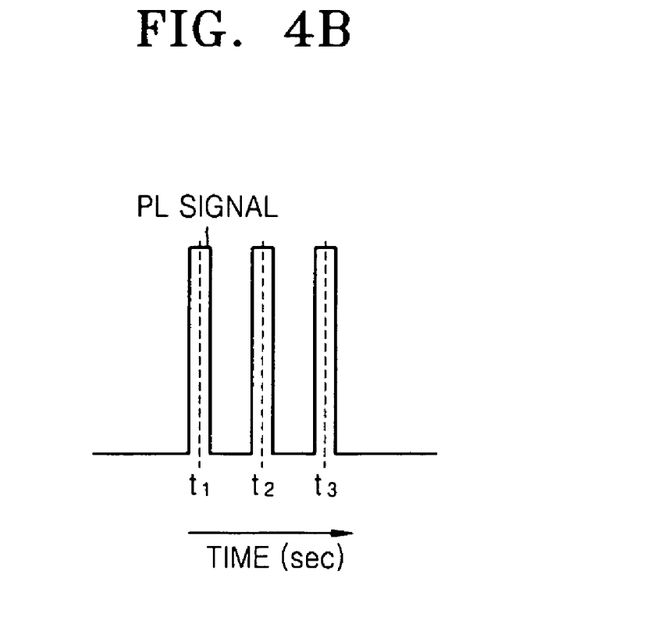
FIG. 4B shows a PL signal emitted when the voltage pulse and the excitation pulse of FIG. 4A are applied to the organic light emitting device of FIG. 3.

FIG. 4A shows examples of the voltage pulse and the excitation pulses applied to the organic light emitting device of FIG. 3, and FIG. 4B shows the PL signal emitted from the organic light emitting device of FIG. 3 when the voltage pulse and the excitation pulses of FIG. 4A are applied to the organic light emitting device.

Referring to FIGS. 4A and 4B, it is assumed that the times for the holes to reach the first, second, and third organic material layers 121, 122, and 123 are $t_1$, $t_2$, and $t_3$, respectively, which are shorter than the charge injecting time $t_d$. In the case that the voltage pulse is not applied between the anode 110 and the cathode 130, when the excitation pulses are applied to the first, second, and third organic material layers 121, 122, and 123, overlapped PL signals are respectively emitted from the first, second, and third organic material layers 121, 122, and 123.

However, as shown in FIG. 4A, when the first, second, and third organic material layers 121, 122, and 123 are sequentially irradiated with the excitation pulses while the voltage pulse is applied between the anode 110 and the cathode 130, the PL signals emitted from the first, second, and third organic material layers 121, 122, and 123 are generated as shown in FIG. 4B. In more detail, when the time $t_1$ has elapsed, the holes reach the first organic material layer 121, and accordingly, the concentration of holes in the first organic material layer 121 is changed. Therefore, the PL signal emitted from the first organic material layer 121 is changed. Here, the change of the PL signal may be a change in signal intensity or a change in decay time of the signal.

Meanwhile, at this time, the PL signals emitted from the second and third organic material layers 122 and 123 are not changed. Next, when the time $t_2$ has elapsed, the holes reach the second organic material layer 122, and accordingly, the concentration of holes in the second organic material layer 122 is also changed. Therefore, the PL signals emitted from the first and second organic material layers 121 and 122 are changed. Here, the PL signal emitted from the third organic material layer 123 is not changed. In addition, when the time $t_3$ has elapsed, the holes reach the third organic material layer 123, and accordingly, the concentration of the holes in the third organic material layer 123 is also changed. Therefore, the PL signals emitted from the first, second, and third organic material layers 121, 122, and 123 are changed. As described above, 2-bit calculation may be performed using the changes in the PL signals emitted from the first, second, and third organic material layers 121, 122, and 123. In addition, if the changes in the PL signal emitted from a certain organic material layer are measured by differentiating the application times of the voltage pulse and the excitation pulse or changing the wavelength of the excitation pulse, more calculations may be performed. As described above, the organic light emitting device of FIG. 3 may be used as a photoelectric transistor that can realize multi-leveling within the charge injecting time $t_d$.

Based on the above principle, the present invention provides an organic light emitting display device that uses the organic light emitting device as a photoelectric transistor using the PL operation within the charge injecting time $t_d$, and uses the organic light emitting device as a light emitting pixel forming an image using an electroluminescence (EL) operation after the charge injecting time $t_d$. Here, the photoelectric transistor may be used in a processing circuit, for example, a circuit for compensating a change of brightness, or an input device such as a touch screen in the organic light emitting display device. In order to perform a process using the above-described photoelectric transistor, an additional voltage for processing is added to the original voltage pulse to perform the process.

Figure 5:
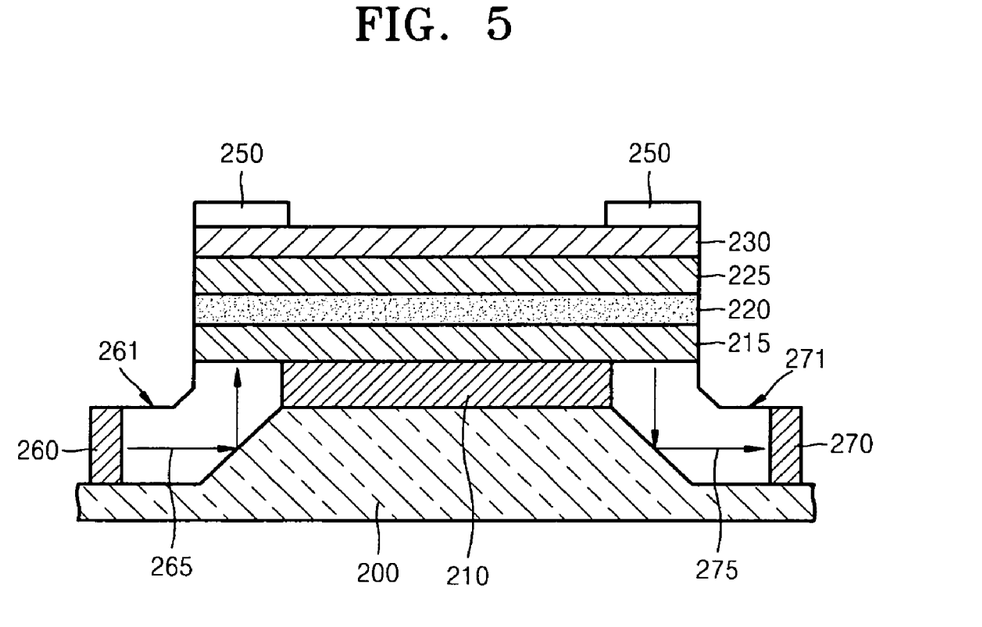
FIG. 5 is a cross-sectional view of an organic light emitting display device according to an embodiment of the present invention.

FIG. 5 is a cross-sectional view of an organic light emitting display device according to an embodiment of the present invention.

Referring to FIG. 5, the organic light emitting display device according to the current embodiment of the present invention includes an anode 210 and a cathode 230, which are separated from each other, a plurality of organic material layers 215, 220, and 225 formed between the anode 210 and the cathode 230, a light source 260 for applying excitation pulses to the organic material layers 215, 220, and 225, and a light receiving unit 270 measuring changes in PL signals that are emitted from the organic material layers 215, 220, and 225.

The anode 210 can be formed on a substrate 200. The substrate 200 may be a transparent glass substrate, a quartz substrate, or a plastic substrate. The anode 210 may be formed of a transparent conductive material having a high conductivity and a high work function, for example, indium tin oxide (ITO), indium zinc oxide (IZO), $SnO_2$, or ZnO. The cathode 230 may be formed of a metal having a low work function, for example, Al, Ag, Mg, Li, Ca, or an alloy of these materials. However, the anode 210 and the cathode 230 are not limited to the above examples.

The plurality of organic material layers 215, 220, and 225 are formed between the anode 210 and the cathode 230. In more detail, a first organic material layer 215, an organic light emitting layer 220, and a second organic material layer 225 are sequentially formed between the anode 210 and the cathode 230. Here, in the organic light emitting layer 220, electrons and holes are combined with each other to emit light of predetermined color using an EL operation. The organic light emitting layer 220 may be a red light emitting layer, a green light emitting layer, or a blue light emitting layer. In addition, the organic light emitting layer 220 may include at least two light emitting layers among the red, green, and blue light emitting layers.

The first organic material layer 215 is a layer for transporting holes easily to the organic light emitting layer 220. The first organic material layer 215 may have a single-layered structure or a multi-layered structure. For example, the first organic material layer 215 can include a hole injection layer and a hole transport layer that are sequentially stacked between the anode 210 and the organic light emitting layer 220. In addition, the second organic layer 225 is a layer for transporting electrons easily to the organic light emitting layer 220. The second organic material layer 225 can have a single-layered structure or a multi-layered structure. For example, the second organic material layer 225 may include an electron injection layer and an electron transport layer that are sequentially stacked between the cathode 230 and the organic light emitting layer 220.

The light source 260 is disposed on one side of the substrate 200, and the light receiving unit 270 is disposed on the opposite side of the substrate 200. The light source 260 emits light pulse of a predetermined wavelength, for example UV light, to the organic material layers 215, 220, and 225. The light source 260 may emit light having wavelengths other than UV wavelength. In the present embodiment, the light source 260 may emit an excitation pulse having a band gap energy that is greater than that of the organic light emitting layer 220. In addition, the light receiving unit 270 measures changes in the PL signals emitted from the organic material layers 215, 220, and 225. Changes in the PL signals may be changes in intensity of the PL signals or changes in the decay time of the PL signals. In FIG. 5, reference numeral 265 denotes the excitation pulse emitted from the light source 260 and transmitting toward the organic material layers 215, 220, and 225. Reference numeral 275 denotes the PL signals emitted from the organic material layers 215, 220, and 225 and transmitting toward the light receiving unit 270.

The excitation pulse 265 emitted from the light source 260 may be incident into an end portion of a lower surface of the first organic material layer 215. In addition, the PL signals 275 can be emitted from the other end portion of the lower surface of the first organic material layer 215 toward the light receiving unit 270. A first waveguide 261 may be disposed between the light source 260 and the first organic material layer 215 for guiding the excitation pulse 265 emitted from the light source 260 toward the first organic material layer 215. In addition, a second waveguide 271 may be disposed between the light receiving unit 270 and the first organic material layer 215 for guiding the PL signals 275 emitted from the organic material layers 215, 220, and 225 toward the light receiving unit 270.

On the other hand, a PL blocking layer 250 may be further formed on both sides of the cathode 230 in order to prevent the PL signals 275 emitted from the organic material layers 215, 220, and 225 from being leaked through upper surface of the organic material layers. In more detail, the PL blocking layer 250 may be formed on upper portions of both sides of the cathode 230.

Hereinafter, a method of driving the organic light emitting display device having the above structure will be described as follows.

First, while a predetermined voltage pulse is applied between the anode 210 and the cathode 230, the light source 260 emits light of a predetermined wavelength, for example UV light, to the organic material layers 215, 220, and 225 in pulse form within the charge injecting time $t_d$, that is, the time before the EL starts. Here, the charge injecting time $t_d$ means the time taken for the holes and electrons to pass through the first and second organic material layers 215 and 225, respectively, responding to the application of the voltage pulse. The excitation pulse 265 emitted from the light source 260 is incident onto the first organic material layer 215 through the first waveguide 261. Here, the excitation pulse 265 can have a band gap energy that is greater than that of the organic light emitting layer 220. In addition, the excitation pulse 265 can have a width that is less than that of the applied voltage pulse.

Next, when the excitation pulse 265 is applied, the PL operation starts, and the PL signals 275 are emitted from the organic material layers 215, 220, and 225. Each of the PL signals 275 may have a width that is less than that of the applied voltage pulse. On the other hand, as described above, the intensities or the decay times of the PL signals 275 emitted from the organic material layers 215, 220, and 225 are changed when the voltage pulse is applied to the organic light emitting device. The changed PL signals 275 reach the light receiving unit 270 through the second waveguide 271 from the lower surface of the first organic material layer 215. The light receiving unit 270 detects the changes in the PL signals 275 emitted from the organic material layers 215, 220, and 225, more specifically, the changes in the intensities or the decay times of the PL signals 275. In addition, after the charge injecting time $t_d$ elapses, the EL operation starts, that is, EL signals of predetermined colors are emitted from the organic light emitting layer 220, thereby forming images.

As described above, according to the organic light emitting display device of the present embodiment, before the EL operation starts after the voltage pulse is applied between the anode 210 and the cathode 230, that is, in the charge injecting time $t_d$, the light source 260 applies the excitation pulse 265 to the organic material layers 215, 220, and 225, and then, the changes in the PL signals 275 emitted from the organic material layers 215, 220, and 225 are measured. Therefore, the voltage pulse applied between the anode 210 and the cathode 230, the excitation pulses 265 applied to the organic material layers 215, 220, and 225, and the changes in the PL signals 275 emitted from the organic material layers 215, 220, and 225 in the charge injecting time $t_d$ may correspond to the pulses applied to the gate and the source, and the signal output from the drain in the photoelectric transistor, respectively. Here, if the number of organic material layers is increased, if there is a timing difference between the applications of the voltage pulse and the excitation pulse 265, or if the wavelength of the excitation pulse 265 is changed to detect the change in the PL signal 275 emitted from a certain organic material layer, a photoelectric transistor that can perform more calculations can be realized. The photoelectric transistor may be used in a processing circuit, for example, a circuit for compensating the changes in the brightness, or an input device such as a touch screen in the organic light emitting display device.

Figure 6A:
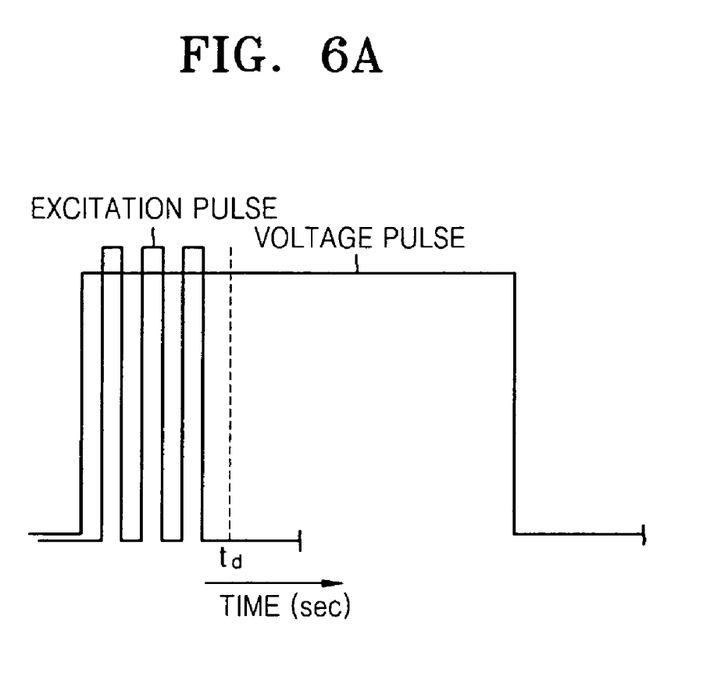
FIGS. 6A and 6B are diagrams showing examples of a voltage pulse and an excitation pulse that can be applied to an organic light emitting display device according to an embodiment of the present invention.
Figure 6B:
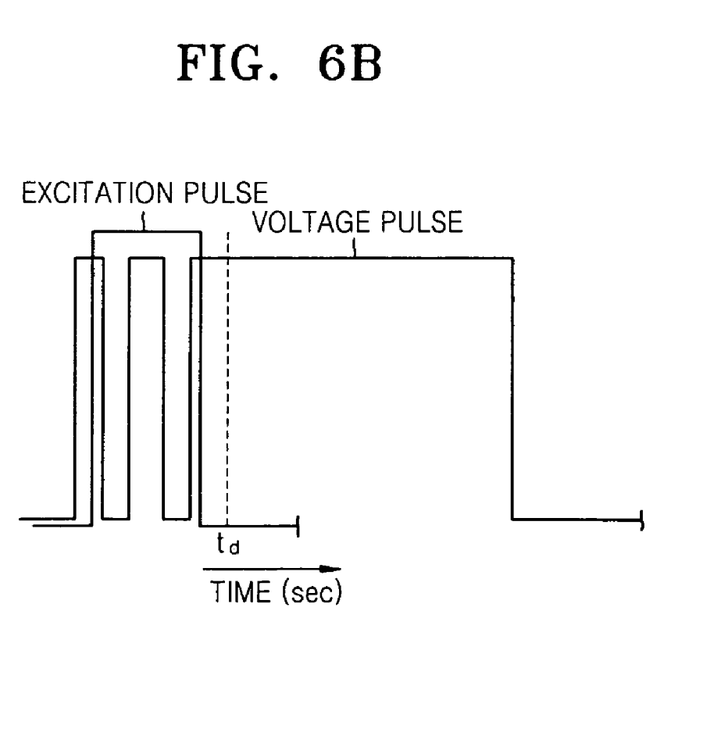

FIGS. 6A and 6B show examples of a voltage pulse and an excitation pulse that can be applied to an organic light emitting display device according to an embodiment of the present invention.

Referring to FIG. 6A, in a state in which a constant voltage pulse is applied between an anode and a cathode in the organic light emitting display device, the excitation pulses are applied at predetermined times within the charge injecting time $t_d$. In addition, referring to FIG. 6B, the voltage pulses are applied to the organic light emitting display device at predetermined times within the charge injecting time $t_d$ in a state in which the excitation pulse is constant. The above-described voltage pulse and the excitation pulse are examples for describing an embodiment of the present invention, and the applications of the voltage pulse and the excitation pulse applied during the charge injecting time $t_d$ may be modified variously.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An organic light emitting display device comprising:
    an anode and a cathode separated from each other;
    a plurality of organic material layers formed between the anode and the cathode, one of the organic material layers comprising an organic light emitting layer;
    a light source applying an excitation pulse to the organic material layers; and
    a light receiving unit measuring changes in photoluminescence (PL) signals that are emitted from the organic material layers.

2. The organic light emitting display device of claim 1, wherein the excitation pulse emitted from the light source is applied to the organic material layers after a voltage pulse is applied between the anode and the cathode and before an electroluminescence (EL) operation starts.

3. The organic light emitting display device of claim 2, wherein the voltage pulse, the excitation pulse, and the changes of the PL signals respectively correspond to a gate pulse applied to a gate, a source pulse applied a source, and a signal output from a drain of a photoelectric transistor.

4. The organic light emitting display device of claim 1, wherein the organic light emitting layer is disposed between a first one of the organic material layers and a second one of the organic material layers.

5. The organic light emitting display device of claim 4, wherein the first one of the organic material layers comprises a hole injection layer and a hole transport layer that are sequentially stacked between the anode and the organic light emitting layer.

6. The organic light emitting display device of claim 4, wherein the second one of the organic material layers comprises an electron injection layer and an electron transport layer that are sequentially stacked between the cathode and the organic light emitting layer.

7. The organic light emitting display device of claim 4, wherein the organic light emitting layer comprises at least one of a red light emitting layer, a green light emitting layer, and a blue light emitting layer.

8. The organic light emitting display device of claim 1, wherein the excitation pulse has a band gap energy that is greater than that of the organic light emitting layer.

9. The organic light emitting display device of claim 1, wherein the light receiving unit measures a change in intensity or a decay time of the PL signal emitted from each of the organic material layers.

10. The organic light emitting display device of claim 1, further comprising a first waveguide disposed between the light source and the organic material layers for guiding the excitation pulse emitted from the light source toward the organic material layers.

11. The organic light emitting display device of claim 10, further comprising a second waveguide disposed between the organic material layers and the light receiving unit for guiding the PL signals emitted from the organic material layers toward the light receiving unit.

12. The organic light emitting display device of claim 1, further comprising a PL blocking layer formed on the cathode for preventing the PL signals emitted from the organic material layers from leaking.

13. The organic light emitting display device of claim 1, wherein the excitation pulse emitted from the light source is incident to an end portion of a lower surface of the organic material layers that is closest to the light source, and the PL signals are emitted from the other end portion on the lower surface.

14. A method of driving an organic light emitting display device, which comprises an anode and a cathode separated from each other, and a plurality of organic material layers formed between the anode and the cathode, the method comprising:
    applying a voltage pulse between the anode and the cathode;
    applying a predetermined excitation pulse to the organic material layers from a light source after the application the voltage pulse and before an electroluminescence (EL) operation starts; and
    measuring changes in photoluminescence (PL) signals emitted from the organic material layers.

15. The method of claim 14, wherein the voltage pulse, the excitation pulse, and the changes of the PL signals respectively correspond to a gate pulse applied to a gate, a source pulse applied to a source, and a signal output from a drain in a photoelectric transistor.

16. The method of claim 14, wherein the excitation pulse emitted from the light source has a band gap energy that is greater than that of the organic light emitting layer.

17. The method of claim 14, wherein the step of measuring changes in the PL signals comprising measuring a change in intensity or a decay time of the PL signals.

18. The method of claim 14, wherein each of a width of the excitation pulse and a width of the PL signal is less than a width of the voltage pulse.

19. A method of driving an organic light emitting display device, which comprises an anode and a cathode separated from each other, a plurality of organic material layers formed between the anode and the cathode, a light source applying a predetermined excitation pulse to the organic material layers, and a light receiving unit measuring changes in photoluminescence (PL) signals that are emitted from the organic material layers, the method comprising:
    applying a predetermined voltage pulse between the anode and the cathode;
    applying the predetermined excitation pulse to the organic material layers from the light source;
    measuring changes in PL signals that are emitted from the organic material layers using the light receiving unit; and
    starting an electroluminescence (EL) operation in the organic light emitting layer.

* * * * *